(12) United States Patent
Utsunomiya

US009485377B2

(10) Patent No.: US 9,485,377 B2
(45) Date of Patent: Nov. 1, 2016

(54) CONTROLLING POWER STATE BASED ON PRESENCE DETECTION

(71) Applicant: CANON KABUSHIKI KAISHA, Tokyo (JP)

(72) Inventor: Takehito Utsunomiya, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/798,109

(22) Filed: Jul. 13, 2015

(65) Prior Publication Data

US 2016/0021272 A1    Jan. 21, 2016

(30) Foreign Application Priority Data

Jul. 18, 2014  (JP) .................. 2014-147415

(51) Int. Cl.
| | |
|---|---|
| *G06F 15/00* | (2006.01) |
| *G06F 3/12* | (2006.01) |
| *G06K 1/00* | (2006.01) |
| *H04N 1/00* | (2006.01) |
| *G06K 15/00* | (2006.01) |

(52) U.S. Cl.
CPC ........ *H04N 1/00891* (2013.01); *G06K 15/406* (2013.01); *H04N 1/00323* (2013.01); *H04N 1/00896* (2013.01); *H04N 2201/0094* (2013.01)

(58) Field of Classification Search
CPC ............. H04N 1/00891; H04N 1/00323; H04N 1/00896; H04N 2201/0094; G06K 15/406
USPC .............. 358/1.1, 1.13, 1.15, 1.14
See application file for complete search history.

(56) References Cited

U.S. PATENT DOCUMENTS

| | | | | |
|---|---|---|---|---|
| 8,657,188 | B2 * | 2/2014 | Ma et al. ............ | 235/379 |
| 8,918,006 | B2 * | 12/2014 | Oyoshi ............... | 399/79 |
| 9,160,876 | B2 * | 10/2015 | Tanisaki | |
| 2012/0328319 | A1 * | 12/2012 | Ogata ................ | G03G 15/5016 399/75 |
| 2013/0010335 | A1 | 1/2013 | Baba | |
| 2014/0153020 | A1 | 6/2014 | Tachikawa | |
| 2015/0002871 | A1 * | 1/2015 | Ono ................... | H04N 1/00896 358/1.13 |

FOREIGN PATENT DOCUMENTS

JP    H07-288875 A    10/1995

\* cited by examiner

*Primary Examiner* — Douglas Tran
(74) *Attorney, Agent, or Firm* — Canon USA, Inc., IP Division

(57) ABSTRACT

An image forming apparatus having a first power state and a second power state, which is lower in power consumption than the first power state, includes a detection unit in which a plurality of elements for detecting an object are arranged, and a control unit configured to acquire a detection result from part of the plurality of elements and to determine whether a person is present in a detection range of the detection unit, and in a case where it is determined that a person is present in the detection range, to acquire a detection result from part of the plurality of elements of the detection unit and to determine whether to shift the image forming apparatus from the second power state to the first power state.

19 Claims, 17 Drawing Sheets

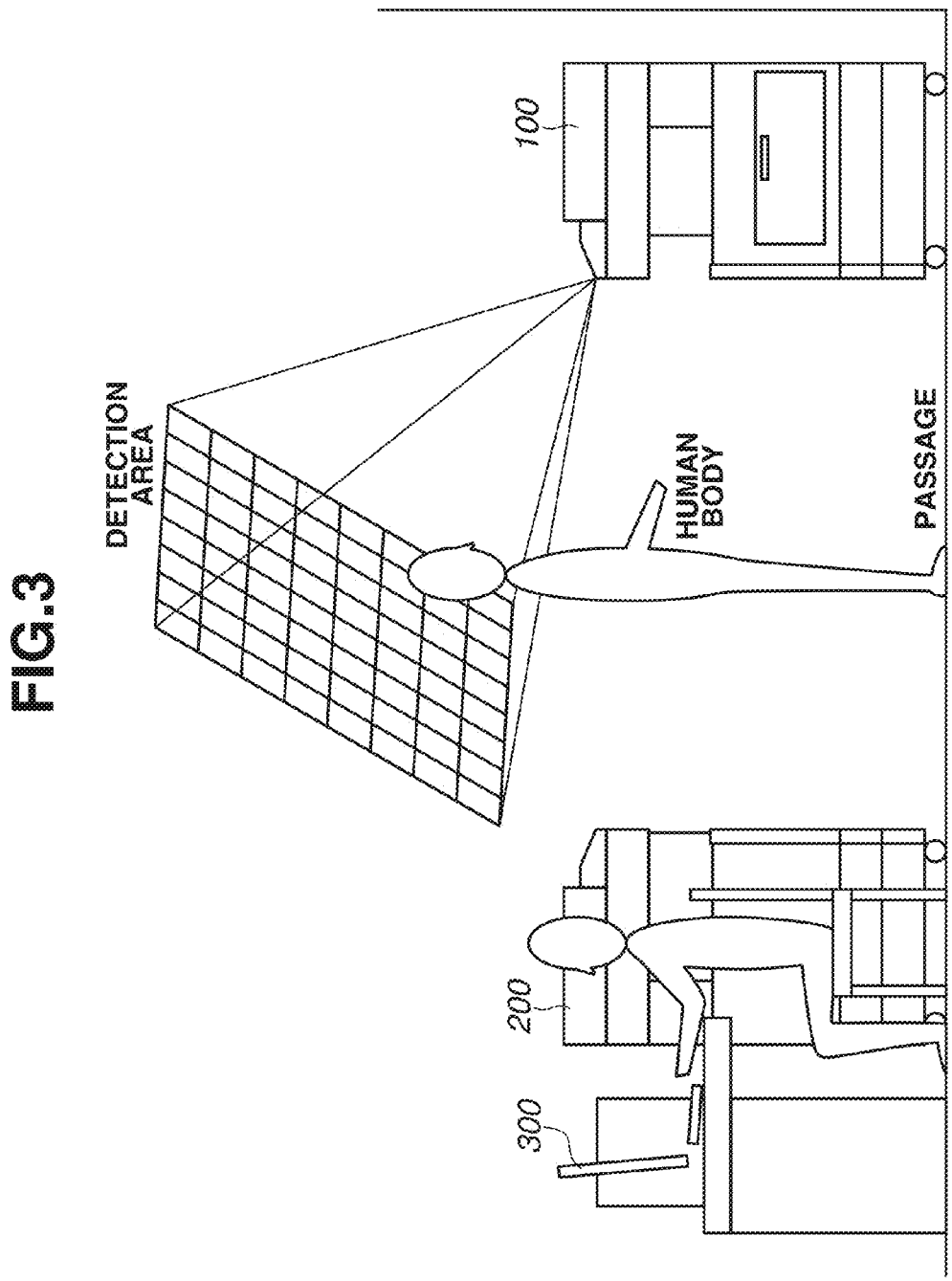

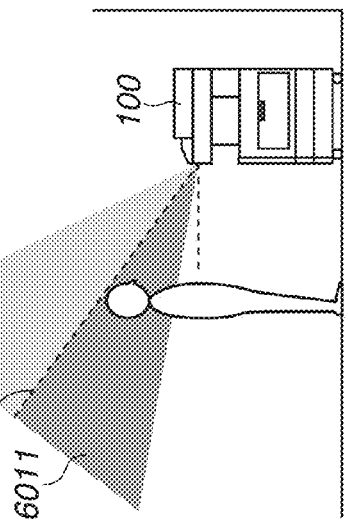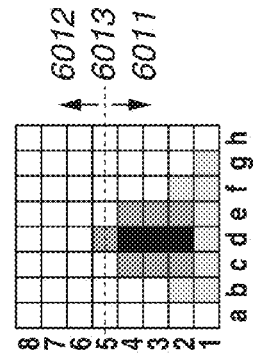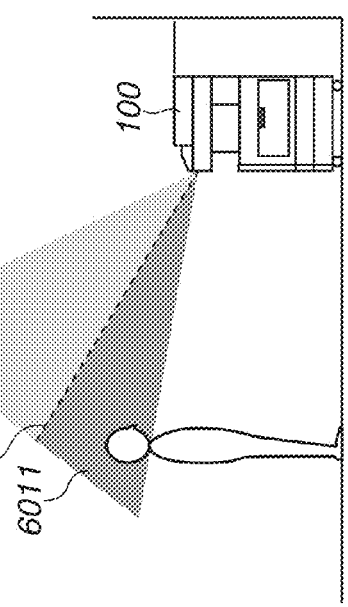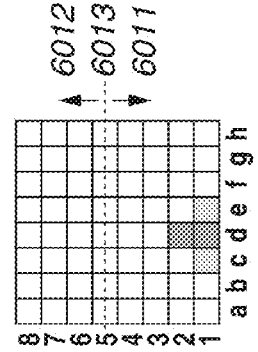

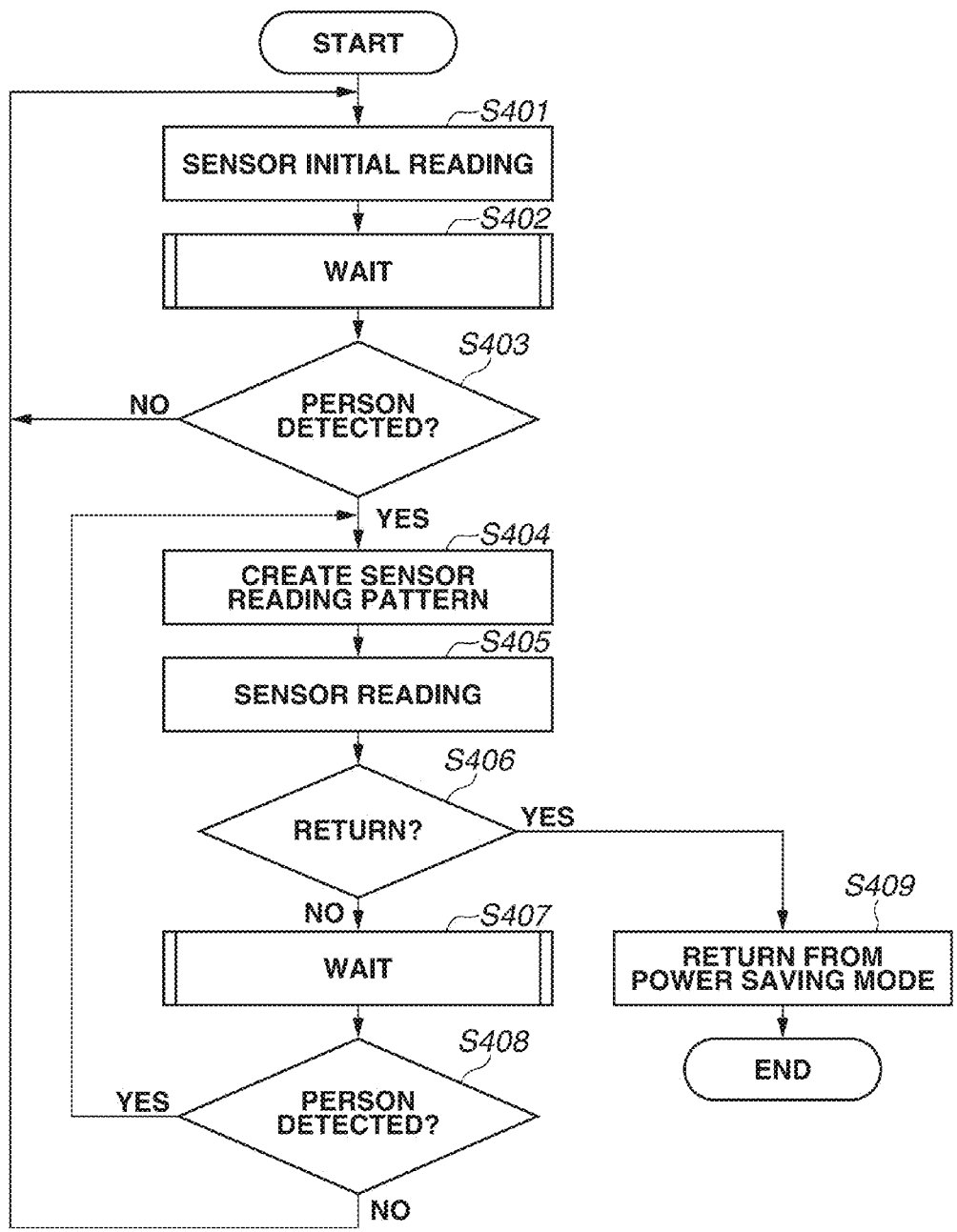

CONTROLLING POWER STATE BASED ON PRESENCE DETECTION

BACKGROUND OF THE INVENTION

1. Field of the Invention

The present invention relates to an image forming apparatus for detecting the approach of a person, using a sensor, thereby controlling a power state, and a method for controlling the image forming apparatus.

2. Description of the Related Art

There is a growing concern about the environment, and many devices have environment-friendly functions, power saving modes and power usage displays. Image forming apparatuses also have power saving modes and are controlled to shift to those power saving modes when the image forming apparatuses are not in use. For example, a technique for detecting the approach of a person, using a sensor, thereby controlling the image forming apparatus is discussed.

Japanese Patent Application Laid-Open No. 7-288875 discusses a technique for acquiring information from an infrared array sensor for detecting a person, and then determining the presence or absence of a person.

In the technique of Japanese Patent Application Laid-Open No. 7-288875, however, a control function for determining the presence or absence of a person based on the detection result of the infrared array sensor reads information from all the elements of the infrared array sensor to make the determination. This increases the power consumption in the control function. Thus, to further save power, it is necessary to reduce the power consumption in the control function.

With reference to FIG. 17, this technique will be specifically described below.

FIG. 17 is a diagram illustrating the operation modes of a processor for reading data from the infrared array sensor in the conventional art and making a determination.

For example, a description will be given using as an example a case where a processor repeats a normal operation mode 14001, in which the processor reads data from the infrared array sensor and makes a determination, and a low power consumption mode 14002, in which the power consumption is reduced without performing processing.

In the example illustrated in FIG. 17, the time in which the processor operates in the normal operation mode 14001 and which includes the time of access to the infrared array sensor and the calculation time for the determination accounts for about 70% of one cycle. This results in a situation where the processor cannot obtain much of the effect of the low power consumption mode 14002. Although depending on the type of the processor, the power consumption of the processor in this state is about 14.8 mW.

Thus, there is a possibility that reduction of the power consumed in the operation for detecting the approach of a user using a sensor (a human detection operation) can further reduce the power consumption of an image forming apparatus for detecting the approach of a user, using a sensor, thereby shifting a power mode.

SUMMARY OF THE INVENTION

The present invention is directed to a mechanism for reducing the power consumption in a human detection operation to further reduce the power consumption of an image forming apparatus.

According to an aspect of the present invention, an image forming apparatus having a first power state and a second power state, which is lower in power consumption than the first power state, includes a detection unit in which a plurality of elements for detecting an object are arranged, and a control unit configured to acquire a detection result from part of the plurality of elements and to determine whether a person is present in a detection range of the detection unit, and in a case where it is determined that a person is present in the detection range, to acquire a detection result from part of the plurality of elements of the detection unit and to determine whether to shift the image forming apparatus from the second power state to the first power state.

Further features of the present invention will become apparent from the following description of exemplary embodiments with reference to the attached drawings.

BRIEF DESCRIPTION OF THE DRAWINGS

FIG. 3 is a diagram illustrating an example of a detection area of an infrared array sensor.

FIGS. 4A and 4B are diagrams each illustrating an example of a detection result of a sensor according to a distance between the image forming apparatus and a human body.

FIG. 5 is a flowchart illustrating an example of a determination process performed by a determination unit.

DESCRIPTION OF THE EMBODIMENTS

Various exemplary embodiments, features, and aspects of the invention will be described in detail below with reference to the drawings. Each of the embodiments of the present invention described below can be implemented solely or as a combination of a plurality of the embodiments or features thereof where necessary or where the combination of elements or features from individual embodiments in a single embodiment is beneficial.

Figure 1:
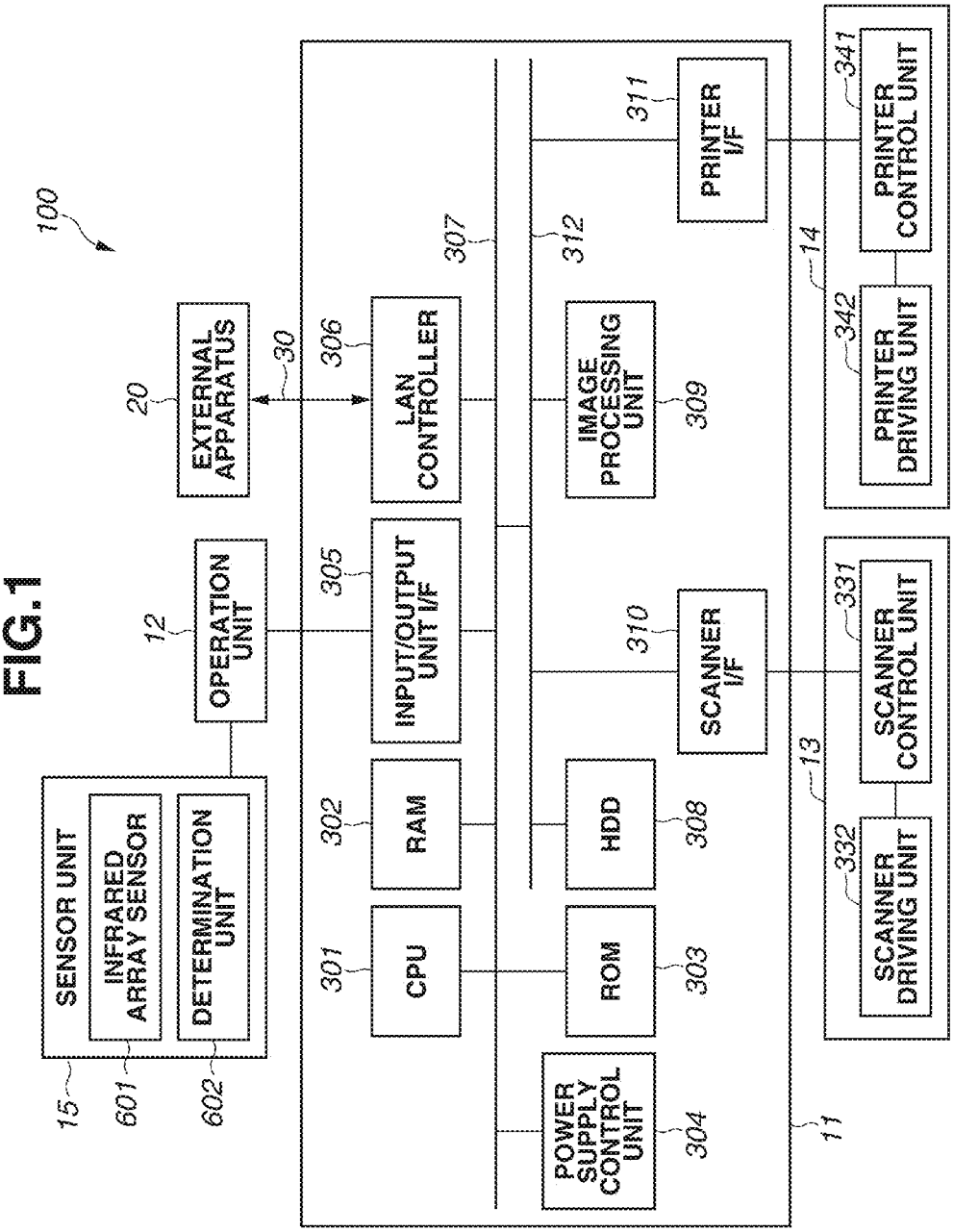
FIG. 1 is a block diagram illustrating an example of a configuration of an image forming apparatus according to a present exemplary embodiment.

FIG. 1 is a block diagram illustrating an example of the configuration of an image forming apparatus according to an exemplary embodiment of the present invention. As illustrated in FIG. 1, an image forming apparatus 100 according to a first exemplary embodiment includes a controller 11, a scanner unit 13, a printer unit 14, an operation unit 12, and a sensor unit 15.

The image forming apparatus 100 has at least two power modes (power states) including a normal operation power mode (a normal operation power state) for performing a copy operation or the like, and a power saving mode (a power saving state), which is lower in power consumption than the normal operation power mode. If the image forming apparatus 100 is not used even after the lapse of a certain period of time, the power mode of the image forming apparatus 100 is shifted to the power saving mode under the control of the controller 11. In the power saving mode, the supply of power to the scanner unit 13 and the printer unit 14 is stopped, and the supply of power to a part within the controller 11 and unnecessary portions within the operation unit 12 is stopped. The details will be described below.

<Description of Controller 11>

A description will be given below of the details of the controller 11, which controls the operation of the entire image forming apparatus 100.

As illustrated in FIG. 1, the controller 11 is electrically connected to the above-described scanner unit 13, the printer unit 14, the operation unit 12, and the like.

The controller 11 includes a central processing unit (CPU) 301, a random-access memory (RAM) 302, a read-only memory (ROM) 303, a power supply control unit 304, an input/output unit interface (I/F) 305, and a local area network (LAN) controller 306. The CPU 301, the RAM 302, the ROM 303, the power supply control unit 304, the input/output unit I/F 305, and the LAN controller 306 are connected to a system bus 307.

The controller 11 also includes a hard disk drive (HDD) 308, an image processing unit 309, a scanner I/F 310, and a printer I/F 311. The HDD 308, the image processing unit 309, the scanner I/F 310, and the printer I/F 311 are connected to an image bus 312.

Based on a control program stored in the ROM 303, the CPU 301 performs overall control of access to various devices connected to the controller 11 and also performs overall control of various processes performed by the controller 11. The RAM 302 is a system work memory for the operation of the CPU 301. The RAM 302 also serves as a memory for temporarily storing image data. The RAM 302 includes a static random-access memory (SRAM), which can hold a stored content even when the power is turned off, and a dynamic random-access memory (DRAM), from which a stored content is erased when the power is turned off. The ROM 303 stores a boot program for the apparatus.

The input/output unit I/F 305 is an interface unit for connecting the system bus 307 and the operation unit 12. The input/output unit I/F 305 receives, from the system bus 307, image data to be displayed on the operation unit 12 and outputs the image data to the operation unit 12. The input/output unit I/F 305 also outputs, to the system bus 307, information input from the operation unit 12 and the sensor unit 15.

The LAN controller 306 controls the input and output of information between the image forming apparatus 100 and an external apparatus 20 (e.g., a personal computer) connected to a network 30. The details of the power supply control unit 304 will be described below.

The image bus 312 is a transmission path for exchanging image data, and is formed of, for example, a Peripheral Component Interconnect (PCI) bus and an Institute of Electrical and Electronics Engineers (IEEE) 1394 bus. The HDD 308 is a hard disk drive and stores system software and image data. The controller 11 may include another storage device such as a solid-state drive (SSD). The image processing unit 309 is used to perform image processing. The image processing unit 309 reads image data stored in the RAM 302 and performs image processing on the image data. Examples of the image processing include the enlargement or reduction and the color adjustment of a Joint Photographic Experts Group (JPEG) image or a Joint Bi-level Image Experts Group (JBIG) image.

<Description of Sensor Unit 15>

The sensor unit 15 includes an infrared array sensor 601 and a determination unit 602. Power is supplied to the sensor unit 15 from a first power supply unit 501 (FIG. 2) to be described below, even in the power saving mode. If power is being supplied to the sensor unit 15, power is always supplied to the infrared array sensor 601, whereas the supply of power to the determination unit 602 may be appropriately stopped. If, however, the infrared array sensor 601 detects a predetermined response, power is immediately supplied to the determination unit 602. In the normal operation power mode, the supply of power to the sensor unit 15 may be disconnected. Then, if the normal operation power mode shifts to the power saving mode, power may be supplied to the sensor unit 15.

The infrared array sensor 601 is formed by arranging, in a matrix, infrared receiving elements (infrared sensors) for receiving infrared light. The infrared array sensor 601 receives infrared light radiated from a person, thereby detecting that the person approaches the image forming apparatus 100. Although a description will be given here of an example in which the infrared array sensor 601 detects a person, the infrared array sensor 601 can detect any object that radiates infrared light. The infrared array sensor 601 is not limited to the above configuration. Further, the present invention is not limited to an infrared array sensor. Alternatively, a different array sensor formed by arranging a plurality of sensors may be used.

The determination unit 602 is, for example, a processor, and reads and executes a program stored in a storage device such as a ROM (not illustrated), thereby achieving the following function. The determination unit 602 processes the detection result of the infrared array sensor 601 (for example, calculates the temperature of an object based on temperature data output from a predetermined infrared receiving element of the infrared array sensor 601) to determine the presence of a user, and outputs a power supply request signal (a signal Q in FIG. 2) to the power supply control unit 304 according to the determination result. If the power supply control unit 304 receives the power supply request signal Q, the power supply control unit 304 returns the power mode of the image forming apparatus 100 to the normal operation power mode. The details of the determination process performed by the determination unit 602 will be described below.

The scanner unit 13 is a device for reading an image formed on a document, thereby acquiring image data. The scanner unit 13 inputs, to a charge-coupled device (CCD) sensor, reflected light of light emitted onto the image formed on the document, thereby converting information about the image into an electric signal. The electric signal is converted into luminance signals of R (red), G (green), and B (blue) colors, and the luminance signals are output to the controller 11. The scanner unit 13 includes a scanner control unit 331 and a scanner driving unit 332. The scanner driving unit 332 is a physically-driving device including a sheet conveying motor for conveying a document set in a tray to a reading position of the scanner unit 13. The scanner control unit 331 controls the operation of the scanner driving unit 332. The scanner control unit 331 receives, through communication with the CPU 301, setting information set by a user when a scanner process is performed. Then, the scanner control unit 331 controls the operation of the scanner driving unit 332 based on the setting information.

The printer unit 14 is a device for forming an image on a sheet using input image data. The printer unit 14 includes a printer control unit 341 and a printer driving unit 342. The printer driving unit 342 is a physically-driving device including a motor for rotating a photosensitive drum, a motor for rotating a fixing device, and a sheet conveying motor. The printer control unit 341 controls the operation of the printer driving unit 342. The printer control unit 341 receives, through communication with the CPU 301, setting information set by the user when a printing process is performed. Then, the printer control unit 341 controls the operation of the printer driving unit 342 based on the setting information. The image forming method of the printer unit 14 is not limited to an electrophotographic method using a photosensitive drum and a photosensitive belt. Alternatively, for example, the printer unit 14 may use an ink-jet method for discharging ink from a minute nozzle array to perform printing on a sheet, or another printing method.

<Description of Configuration of Power Supply Circuit of Image Forming Apparatus>

Figure 2:
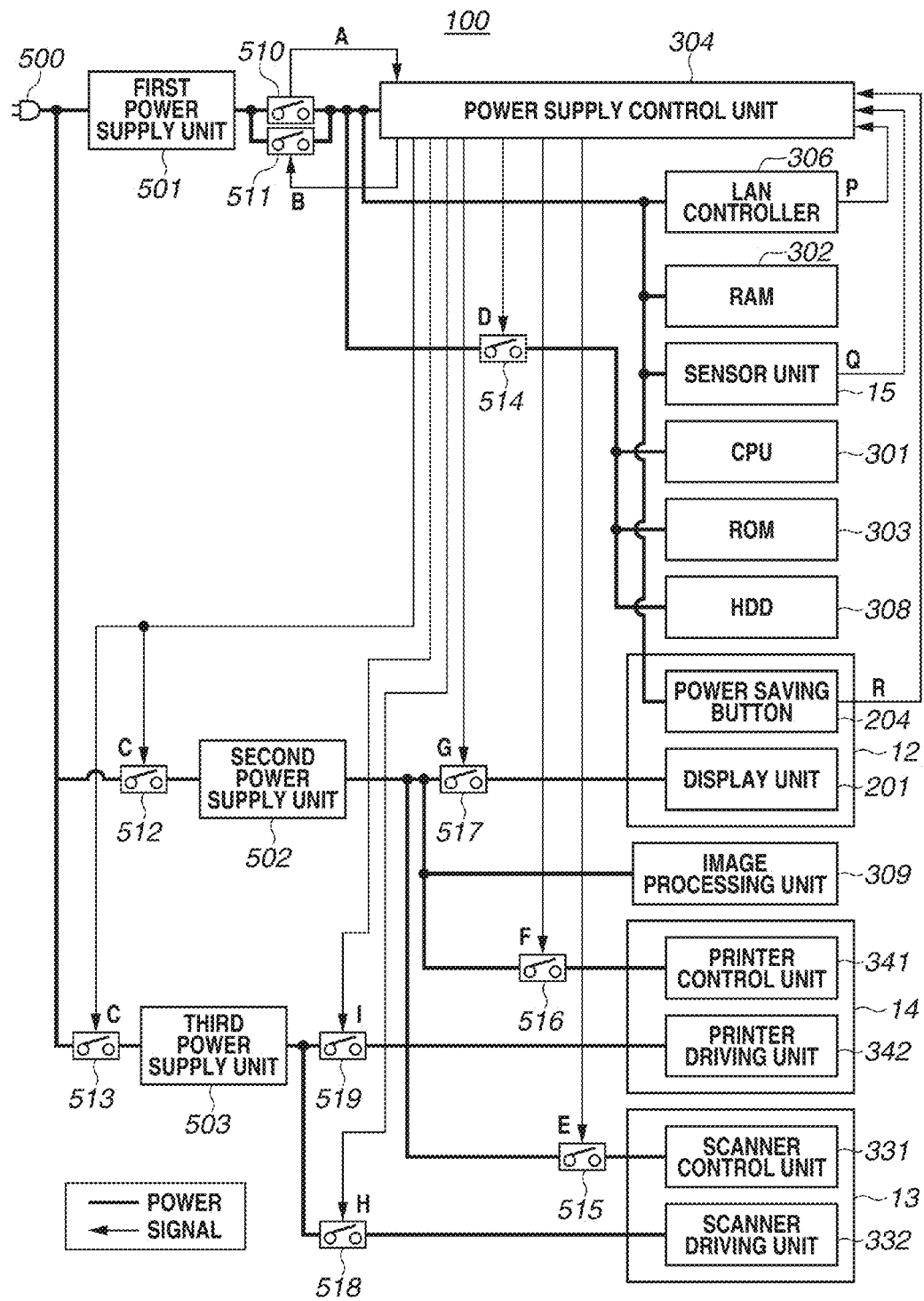
FIG. 2 is a diagram illustrating an example of a configuration of a power supply circuit of the image forming apparatus.

FIG. 2 is a diagram illustrating an example of the configuration of a power supply circuit of the image forming apparatus 100.

To all the above components of the image forming apparatus 100, power generated by a power unit is supplied. The power unit includes the first power supply unit 501, a second power supply unit 502, and a third power supply unit 503. To the power unit, alternating current power is supplied from a public power supply via a power plug 500.

The first power supply unit 501 converts the alternating current power supplied via the power plug 500 into direct current power (e.g., 5.1 V (first output power)). Then, the direct current power is supplied to devices in a first power supply system (the power supply control unit 304, the CPU 301, the RAM 302, the ROM 303, the HDD 308, the LAN controller 306, the sensor unit 15, and a power saving button 204 of the operation unit 12). In the present exemplary embodiment, the CPU 301 operates with power supplied only from the first power supply unit 501, without receiving the supply of power from the second power supply unit 502 or the third power supply unit 503. That is, the power supply of the CPU 301 is independent of the second power supply unit 502 and the third power supply unit 503.

The second power supply unit 502 converts the alternating current power supplied via the power plug 500 into direct current power (e.g., 12 V (second output power)). The direct current power is supplied to devices in a second power supply system (a display unit 201 of the operation unit 12, the image processing unit 309, the printer control unit 341 of the printer unit 14, and the scanner control unit 331 of the scanner unit 13).

Further, the third power supply unit 503 converts the alternating current power supplied via the power plug 500 into direct current power (e.g., 24 V) and supplies the power to devices in a third power supply system (the printer driving unit 342 and the scanner driving unit 332).

Further, between the first power supply unit 501 and the devices in the first power supply system, a power switch 510 is provided. The power switch 510 enters an on state or an off state by an operation performed by the user. To the power supply control unit 304, a signal A, which indicates the state (the on state or the off state) of the power switch 510, is input from the power switch 510. Further, between the first power supply unit 501 and the devices in the first power supply system, a switch 511 is provided. The switch 511 is placed in parallel with the power switch 510, and includes a field-effect transistor (FET). The switch 511 changes from an on state to an off state or from the off state to the on state according to a control signal B, which is output from the power supply control unit 304.

Between the power plug 500 and the second power supply unit 502, a relay switch 512 is provided. Further, between the power plug 500 and the third power supply unit 503, a relay switch 513 is provided. Each of the relay switches 512 and 513 changes from an on state to an off state or from the off state to the on state according to a control signal C, which is output from the power supply control unit 304.

Between the power switch 510 and the CPU 301, the ROM 303, and the HDD 308, a switch 514 is provided. The switch 514 changes from an on state to an off state or from the off state to the on state according to a control signal D, which is output from the power supply control unit 304.

Between the second power supply unit 502 and the display unit 201, a switch 517 is provided. Between the second power supply unit 502 and the printer control unit 341, a switch 516 is provided. Further, between the third power supply unit 503 and the printer driving unit 342, a switch 519 is provided. The switch 517 changes from an on state to an off state or from the off state to the on state according to a control signal G, which is output from the power supply control unit 304. The switch 516 changes from an on state to an off state or from the off state to the on state according to a control signal F, which is output from the power supply control unit 304. Further, the switch 519 changes from an on state to an off state or from the off state to the on state according to a control signal I, which is output from the power supply control unit 304.

Between the second power supply unit 502 and the scanner control unit 331, a switch 515 is provided. Further, between the third power supply unit 503 and the scanner driving unit 332, a switch 518 is provided. The switch 515 changes from an on state to an off state or from the off state to the on state according to a control signal E, which is output from the power supply control unit 304. Further, the switch 518 changes from an on state to an off state or from the off state to the on state according to a control signal H, which is output from the power supply control unit 304.

The power supply control unit 304 will be described below.

The power supply control unit 304 is, for example, a complex programmable logic device (CPLD). The power supply control unit 304 controls the image forming apparatus 100 to shift to each of the above power states. To the power supply control unit 304, power is supplied in the power saving mode, and the power supply control unit 304 detects a plurality of types of return triggers for returning from the power saving mode.

The power supply control unit 304 receives as a return trigger a signal P from the LAN controller 306. The signal P is output to the power supply control unit 304 when the LAN controller 306 receives a page description language (PDL) job.

Further, the power supply control unit 304 receives as a return trigger a signal R from the power saving button 204 of the operation unit 12. The signal R is output to the power supply control unit 304 when the power saving button 204 is operated by the user. Further, the power supply control unit 304 receives as a return trigger the signal Q from the sensor unit 15. The signal Q is output to the power supply control unit 304 when the sensor unit 15 detects a person approaching the image forming apparatus 100.

Further, the power supply control unit 304 may receive another signal as a return trigger.

For example, the power supply control unit 304 receives as a return trigger a signal from a document detection sensor (not illustrated) for detecting a document placed on a document tray of a document feeding device attached to the scanner unit 13. This signal is output to the power supply control unit 304 when the document detection sensor detects a document. Further, the power supply control unit 304 receives as a return trigger a signal from a sheet detection sensor (not illustrated) provided in a manual feed tray of the printer unit 14. This signal is output to the power supply control unit 304 when a sheet is set in the manual feed tray.

The power supply control unit 304 changes the states of the switches 511 to 518 to the on states based on the above return triggers (the signals P, Q, and R or the above signals that are not illustrated).

If the power switch 510 enters the off state by an operation performed by the user, the signal A in a signal state indicating the off state is input to the power supply control unit 304. If the signal A in the signal state indicating the off state is input to the power supply control unit 304, the power supply control unit 304 changes the states of the switches 511 to 518 to the off states, and the image forming apparatus 100 shifts to a power off state.

The power supply control unit 304 may perform control so that the supply of power to the sensor unit 15 is disconnected in the normal operation power mode, and if the image forming apparatus 100 shifts to the power saving mode, power is supplied to the sensor unit 15.

With reference to FIGS. 3, 4A, and 4B, a description will be given below of a human body detection operation performed by the sensor unit 15.

FIG. 3 is a diagram illustrating an example of a detection area (a detection range) of the infrared array sensor 601 of the sensor unit 15.

The infrared array sensor 601 according to the present exemplary embodiment is, for example, a sensor formed by arranging a plurality of infrared receiving elements (infrared sensors) on M×N lines or in an M×N grid. In this case, M and N are natural numbers and may be the same values. The arrangement of the plurality of infrared receiving elements in the infrared array sensor 601 is not limited to the M×N grid, and may be any arrangement. Further, each of the plurality of infrared receiving elements (infrared sensors) included in the infrared array sensor 601 is hereinafter referred to as an "element".

The infrared array sensor 601 is characterized by receiving, by each of elements arranged in a grid, infrared light radiated from a heat source such as a human body, and using temperature values measured from the results of the light reception by these elements, thereby identifying the shape of the heat source as temperature distribution. As illustrated in FIG. 3, the infrared array sensor 601 can detect an object within a space extending radially from a detection surface (the surface on which the elements are arranged). Using such characteristics of the infrared array sensor 601, the image forming apparatus 100 detects the temperature of a heat source approaching the image forming apparatus 100 and determines, based on the shape and the temperature of the heat source, whether the heat source is a human body. To reliably detect the body temperature of a person, the detection of an exposed portion of the skin increases the accuracy. Thus, in the image forming apparatus 100, the detection area of the infrared array sensor 601 is set to be obliquely upward in the front surface direction (the left direction in FIG. 3) from the main body portion of the image forming apparatus 100 so that the temperature of the face of a person can be detected. That is, the infrared array sensor 601 is installed such that the detection surface of the infrared array sensor 601 is directed obliquely upward from the front surface of the image forming apparatus 100. The infrared array sensor 601 is directed obliquely upward in the front surface direction so as to avoid detecting the heat of another apparatus 200 placed in front of the image forming apparatus 100, a personal computer (PC) or a monitor 300 on a desk, or a person seated on a chair.

When any of the M×N elements detects a temperature exceeding a preset temperature, the infrared array sensor 601 can output an interrupt signal. Then, the determination unit 602 having received the interrupt signal reads a register to identify which of the elements detects a temperature exceeding the preset temperature. The image forming apparatus 100 uses the interrupt function of the infrared array sensor 601 to supply power to the determination unit 602 or start the operation of the determination unit 602. Alternatively, power may be always supplied to the determination unit 602, and the determination unit 602 may perform the operation of reading the detection result of the infrared array sensor 601 every certain period of time.

FIGS. 4A and 4B are diagrams each illustrating an example of the detection result of a human detection sensor according to the distance between the image forming apparatus 100 and a human body.

Each of FIGS. 4A and 4B illustrates the distance between the main body portion of the image forming apparatus 100 and a human body in the upper part and illustrates the detection result of an infrared array sensor at this distance in the lower part.

In the present exemplary embodiment, for example, a description will be given using, as the infrared array sensor 601, an infrared array sensor formed by arranging a total of 64 elements on eight rows 1 to 8 and eight columns a to h. In the following description, the positions of the elements of the infrared array sensor 601 are denoted by 1a to 8h.

FIG. 4A illustrates a case where a human body enters a distance area in which the infrared array sensor 601 can detect the human body, and the detection result of the infrared array sensor 601 indicates that several elements in a lower portion, namely, the elements 1c, 1d, 1e, and 2d, detect a heat source. If the human body comes closer to the image forming apparatus 100 as illustrated in FIG. 4B, the detection result of the infrared array sensor 601 indicates that the temperature detection spreads to an area enlarged upward, from the first row to the second, third, fourth, and fifth rows, and also enlarged to the left and right, from the column d to the columns c, e, b, f and g.

While the person moves from the position in FIG. 4A to the position in FIG. 4B, the determination unit 602 determines, based on the detection result in a determination area 6011, whether the person is approaching the apparatus. If the heat source detected area goes beyond a preset threshold 6013 and enters a return area 6012, the determination unit 602 determines that the human body falls within a predetermined distance (a power saving return distance) of the image forming apparatus 100. Then, the determination unit 602 outputs the power supply request signal Q to the power supply control unit 304, thereby changing the power state of the image forming apparatus 100. The threshold 6013 illustrated in FIGS. 4A and 4B is set linearly on the fifth row of the detection area, but does not necessarily need to be linear. Alternatively, the threshold 6013 may be set obliquely or may have various shapes such as a V-shape.

As described above, the determination unit 602 acquires temperature data from elements of the infrared array sensor 601 in a predetermined cycle and determines whether to switch the power state of the image forming apparatus 100 from the power saving state to the normal power state.

Next, with reference to FIGS. 5 to 12, a description will be given of the determination process performed by the determination unit 602.

FIG. 5 is a flowchart illustrating an example of the determination process performed by the determination unit 602 in the sensor unit 15. The processing of the flowchart is achieved by, for example, the determination unit 602, which includes a processor, reading and executing a program stored in a storage device such as a ROM (not illustrated).

FIGS. 6 to 10 are diagrams for illustrating elements from which the determination unit 602 reads temperature data in the infrared array sensor 601.

Figure 11:
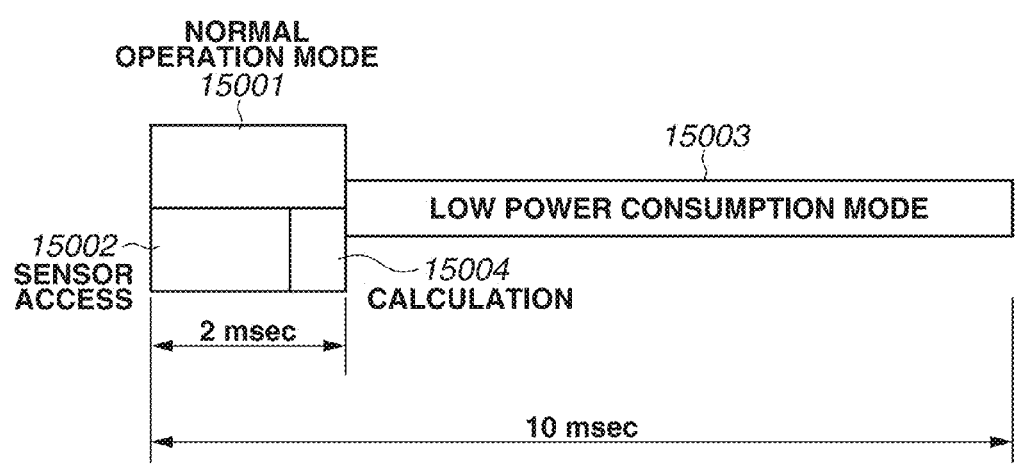
FIG. 11 is a diagram illustrating a proportion of execution of operation modes of the determination unit in a state where a person is not detected.
Figure 12:
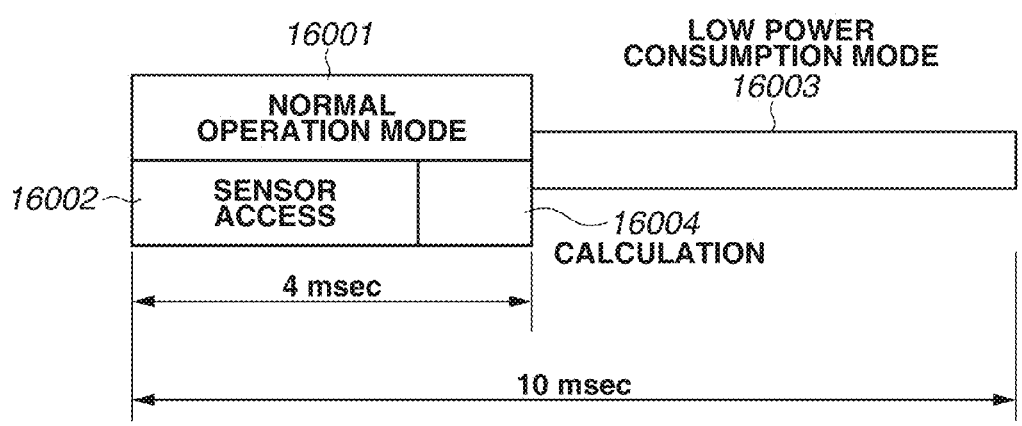
FIG. 12 is a diagram illustrating a proportion of execution of the operation modes of the determination unit in a state where a person is detected.

FIGS. 11 and 12 are diagrams for illustrating the operation modes of the determination unit 602. As described above, the determination unit 602 acquires temperature data from the infrared array sensor 601 in a predetermined cycle and determines whether to switch the power state. FIG. 11 corresponds to the operation of the determination unit 602 in the first cycle and in the cycle after a cycle where it is not determined that a person is detected. Further, FIG. 12 corresponds to the operation of the determination unit 602 in the cycle after a cycle where it is determined that a person is detected. That is, if a person is not detected in the previous cycle, the determination unit 602 operates in the operation modes in a proportion as illustrated in FIG. 11. If a person is detected in the previous cycle, the determination unit 602 operates in the operation modes in a proportion as illustrated in FIG. 12.

Figure 6:
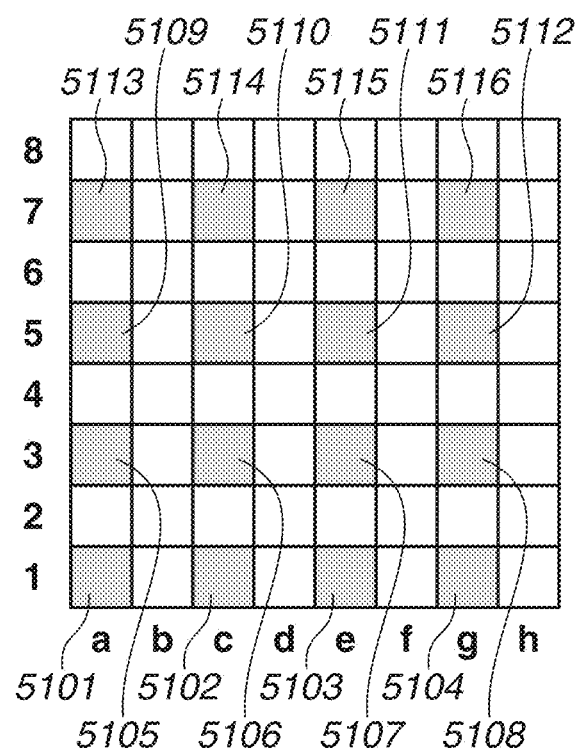
FIG. 6 is a diagram for illustrating elements from which temperature data is read according to a first exemplary embodiment.

After the sensor unit 15 is turned on, then in step S401, the determination unit 602 measures temperature data (sensor initial reading) using elements 5101 to 5116 of the infrared array sensor 601 that are illustrated in FIG. 6. That is, the determination unit 602 reads temperature data from some predetermined elements in the infrared array sensor 601. The reading process in step S401 corresponds to sensor access 15002 in FIG. 11. At this time, the determination unit 602 operates in a normal operation mode 15001.

In the above sensor initial reading, the combination of elements from which data is read is not limited to the combination illustrated in FIG. 6. Another combination of elements in the infrared array sensor 601 can also obtain a similar effect. For example, FIG. 6 illustrates a configuration in which data is acquired from elements placed at odd-numbered positions (on the odd-numbered columns and the odd-numbered rows) in the vertical and horizontal directions of the infrared array sensor 601. Alternatively, the configuration may be such that data is acquired from elements placed at even-numbered positions (on the even-numbered columns and the even-numbered rows) in the vertical and horizontal directions of the infrared array sensor 601. Further, data may be acquired not only from elements extracted at intervals of one element such as odd-numbered or even-numbered positions, but also from elements extracted at intervals of two or more elements. For example, data may be acquired from elements extracted at regular intervals from the infrared array sensor 601. Alternatively, the extraction intervals may be varied between an outermost portion and an inner portion of the infrared array sensor 601. For example, the extraction intervals may be relatively narrowed (elements may be relatively densely extracted) in the outermost portion of the infrared array sensor 601, and the extraction intervals may be relatively widened (elements may be relatively sparsely extracted) in the inner portion of the infrared array sensor 601. Alternatively, in the above sensor initial reading, the configuration may be such that data is acquired from only elements placed in the outermost portion (all or some of the elements placed in the outermost portion) of the infrared array sensor 601. In the above sensor initial reading, the configuration may only need to be such that data is read from some of the elements in the infrared array sensor 601. Thus, the combination of elements from which data is read is not limited.

To make the cycle of detecting a person constant, the determination unit 602 reads data from the infrared array sensor 601 in a constant cycle T.

In step S402, the determination unit 602 counts the difference in time between the cycle T and the time taken in the process of step S401 (WAIT). During this counting, the determination unit 602 operates in a low power consumption mode 15003 (FIG. 11) in which power is supplied to only necessary portions and the operating frequency is reduced. If the determination unit 602 ends the counting, the processing proceeds to step S403.

In step S403, the determination unit 602 determines whether data indicating a predetermined temperature or above is present (the presence of a person is detected) in the sensor data group (5101 to 5116) read in step S401. The determination process in step S403 corresponds to calculation 15004 in FIG. 11. At this time, the determination unit 602 operates in the normal operation mode 15001.

Then, if data indicating the predetermined temperature or above is not present in the sensor data group (5101 to 5116), the determination unit 602 determines that a person is not present (the presence of a person is not detected) in the measurement range of the infrared array sensor 601 (No in step S403), and the processing returns to step S401. In the first cycle and in the cycle after a cycle where it is determined that the presence of a person is not detected, the determination unit 602 operates in the operation modes in the proportion as illustrated in FIG. 11. Although depending on the type of the determination unit 602, the power consumption of the determination unit 602 in the state of FIG. 11 is about 4.2 mW in the present exemplary embodiment.

If, on the other hand, data indicating the predetermined temperature or above is present in the sensor data group (5101 to 5116), the determination unit 602 determines that a person is present (the presence of a person is detected) in the measurement range of the infrared array sensor 601 (Yes in step S403), and the processing proceeds to step S404.

In step S404, the determination unit 602 creates, from the plurality of elements in the infrared array sensor 601, a pattern for reading an element group from which data is read next (a sensor reading pattern).

Figure 7:
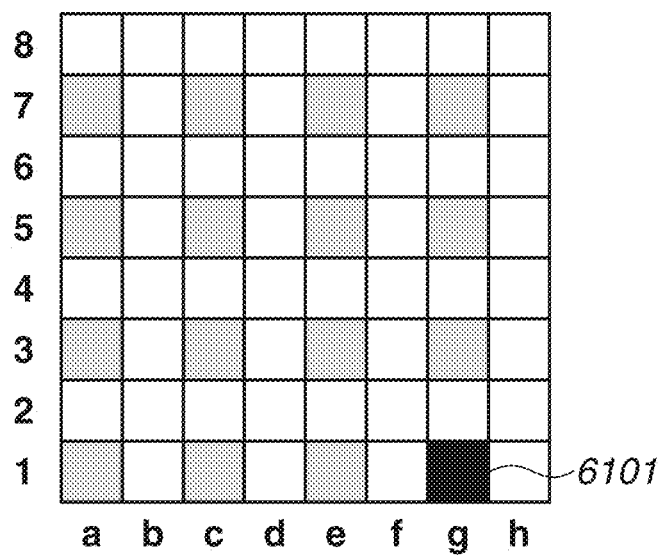
FIG. 7 is a diagram for illustrating elements from which temperature data is read according to the first exemplary embodiment.

A description will be given here on the assumption that the determination unit 602 determines that data indicates the predetermined temperature or above at the position of the element 1*g* (6101 in FIG. 7). In the present exemplary embodiment, the determination unit 602 creates a sensor reading pattern 7102, which includes the elements 4*f* to 4*h*, 3*e* to 3*h*, 2*d* to 2*h*, and 1*d* to 1*h* illustrated in FIG. 8 in a predetermined range having its center at the element 1*g* (6101), which is the element determined to have detected a person.

Figure 8:
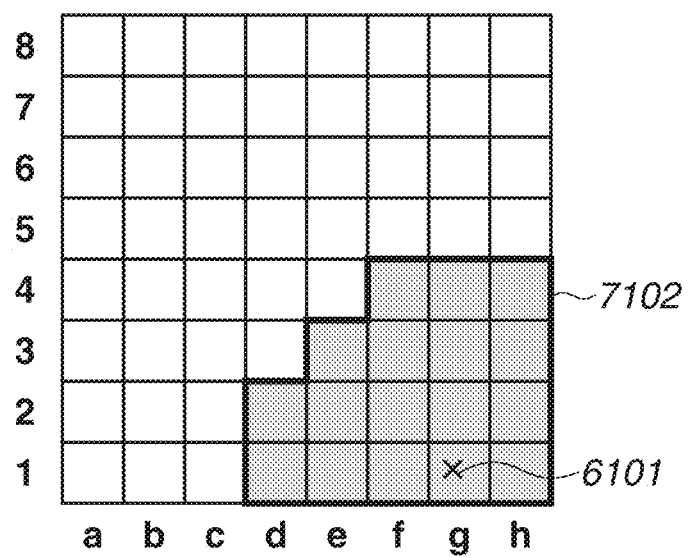
FIG. 8 is a diagram for illustrating elements from which temperature data is read according to the first exemplary embodiment.
Figure 9:
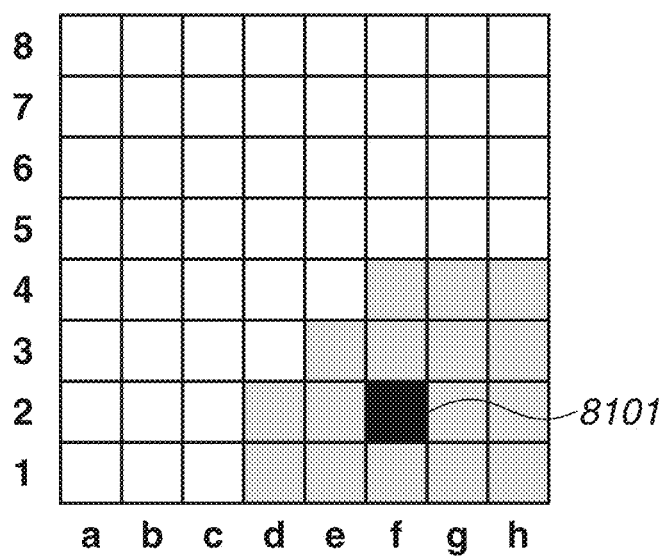
FIG. 9 is a diagram for illustrating elements from which temperature data is read according to the first exemplary embodiment.
Figure 10:
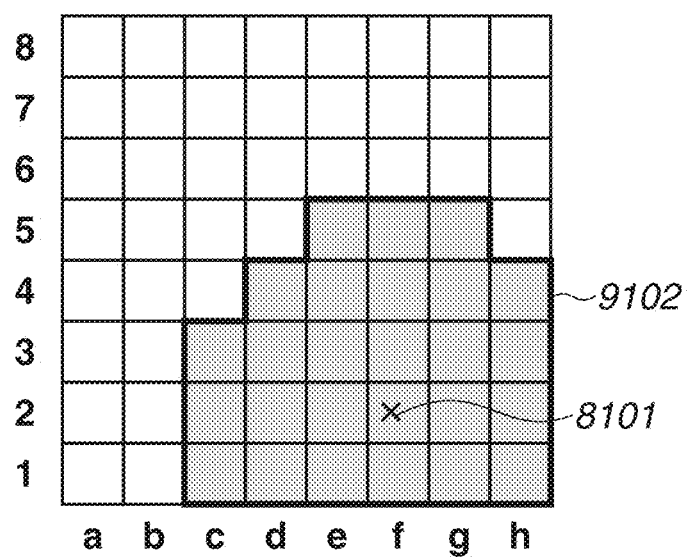
FIG. 10 is a diagram for illustrating elements from which temperature data is read according to the first exemplary embodiment.

Elements from which data is read are not limited to the elements in the area 7102 illustrated in FIG. 8. For example, the configuration may only need to be such that data is acquired from an element group dynamically determined according to the position, in the infrared array sensor 601, of an element from which a detection result indicating a temperature equal to or higher than a predetermined temperature is acquired. At this time, the configuration may be such that data is read from not all the elements in the area 7102 illustrated in FIG. 8, but from some of the elements. Further, elements from which data is read may be extracted at regular intervals. Alternatively, the extraction intervals may be relatively narrowed (elements may be relatively densely extracted) in an outermost portion of the area 7102, and the extraction intervals may be relatively widened (elements may be relatively sparsely extracted) in an inner portion of the area 7102.

Next, in step S405, the determination unit 602 performs the operation of reading (sensor reading) temperature data from the elements in the infrared array sensor 601 that correspond to the sensor reading pattern created in step S404. That is, the determination unit 602 reads temperature data from some elements determined according to the element of the infrared array sensor 601 that has detected a person. The reading process in step S405 corresponds to sensor access 16002 in FIG. 12. At this time, the determination unit 602 operates in a normal operation mode 16001.

Next, in step S406, based on the data read from the element group 7102 in step S405, the determination unit 602 determines whether to return the image forming apparatus 100 from the power saving mode to the normal operation power mode (whether a return condition is satisfied). In the present exemplary embodiment, if it is determined that, as illustrated in FIG. 4B, the heat source detected area goes beyond the preset threshold 6013 and enters the return area 6012, the determination unit 602 determines to return the image forming apparatus 100 from the power saving mode to the normal operation power mode (that the return condition is satisfied). This determination may be made in step S408 to be described below.

If it is determined in step S406 to return the image forming apparatus 100 from the power saving mode to the normal operation power mode (that the return condition is satisfied) (Yes in step S406), then in step S409, the determination unit 602 outputs the power supply request signal Q to the power supply control unit 304, thereby returning the power state of the image forming apparatus 100 to the normal operation power mode. Then, the processing of this flowchart is ended.

If, on the other hand, it is determined in step S406 not to return the image forming apparatus 100 from the power saving mode to the normal operation power mode (that the return condition is not satisfied) (No in step S406), the processing proceeds to step S407.

In step S407, the determination unit 602 counts the difference in time between the above cycle T of detecting a person and the time taken in the process of step S405 (WAIT). Only during this counting, the determination unit 602 may operate in a low power consumption mode 16003 (FIG. 12) for applying a current to only necessary portions and reducing the operating frequency. If the determination unit 602 ends the counting, the processing proceeds to step S408.

In step S408, the determination unit 602 determines whether data indicating the predetermined temperature or above is present (the presence of a person is detected) in the data read from the element group 7102 in step S405. The determination process in step S408 corresponds to calculation 16004 in FIG. 12. At this time, the determination unit 602 operates in the normal operation mode 16001. As described above, in the cycle after a cycle where it is determined that a person is detected, the determination unit 602 operates in the operation modes in the proportion as illustrated in FIG. 12. Although depending on the type of the determination unit 602, the power consumption of the determination unit 602 in the state of FIG. 12 is about 8.4 mW in the present exemplary embodiment.

Then, if data indicating the predetermined temperature or above is not present in the data read from the element group 7102, the determination unit 602 determines that a person is not present (the presence of a person is not detected) in the measurement range of the infrared array sensor 601 (No in step S408), and the processing returns to step S401. As described above, in the cycle after a cycle where it is determined that the presence of a person is not detected, the determination unit 602 operates in the operation modes in the proportion as illustrated in FIG. 11 again.

If, on the other hand, data indicating the predetermined temperature or above is present in the data read from the element group 7102, the determination unit 602 determines that a person is present (the presence of a person is detected) in the measurement range of the infrared array sensor 601 (Yes in step S408), and the processing returns to step S404. As described above, in the cycle after a cycle where it is determined that the presence of a person is detected, the determination unit 602 continues to operate in the operation modes in the proportion as illustrated in FIG. 12.

It is assumed here that the determination unit 602 determines that the data read from the element 2*f* (8101 in FIG. 9) indicates the predetermined temperature or above. This means that the person has moved from the detection position of the element 1*g* (6101 in FIG. 7) to the detection position of the element 2*f* (8101 in FIG. 9). Then, in the process of step S404 in the next cycle, the determination unit 602 creates as a sensor reading pattern an area 9102 (the elements 5*e* to 5*g*, 4*d* to 4*h*, 3*c* to 3*h*, 2*c* to 2*h*, and 1*c* to 1*h*) illustrated in FIG. 10.

After repeating the above processing, if the determination unit 602 determines that the element from which the data indicating the predetermined temperature or above is read goes beyond the threshold 6013 (FIG. 3) and is present in the return area 6012, the determination unit 602 outputs the power supply request signal Q to the power supply control unit 304, thereby changing the power state of the image forming apparatus 100.

Figure 17:
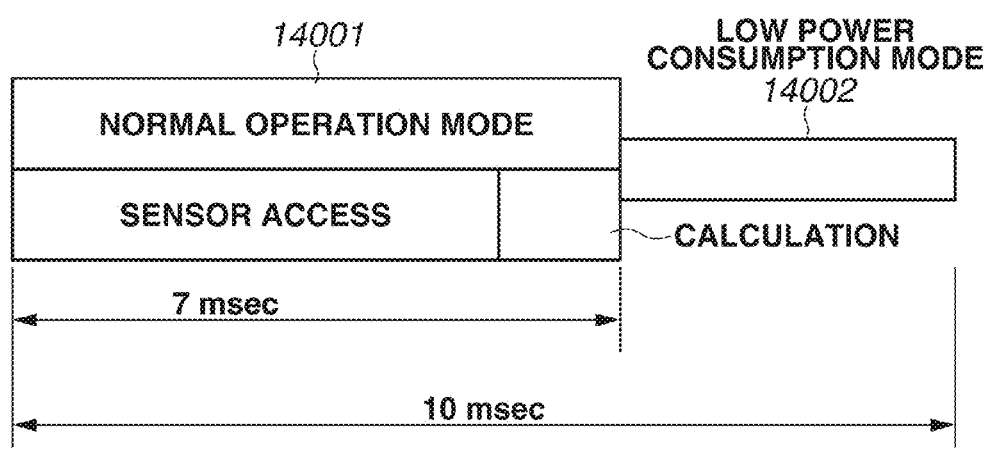
FIG. 17 is a diagram for illustrating operation modes of a processor for reading data from an infrared array sensor and making a determination according to the prior art.

As described above, according to the first exemplary embodiment, the determination unit 602 is configured to read data only from elements in a predetermined range (7102 in FIG. 8 or 9102 in FIG. 10) having its center at an element (e.g., 6101 in FIG. 7 or 8101 in FIG. 9) determined to have detected a person. This enables the determination unit 602 to make a determination regarding a return only by access to and calculation of minimum elements. This can achieve low power consumption in the power saving mode. For example, if a person is not detected in the previous cycle, the determination unit 602 operates as in FIG. 11 (20% in the normal operation mode and 80% in the low power consumption mode). If a person is detected in the previous cycle, the determination unit 602 operates as in FIG. 12 (40% in the normal operation mode and 60% in the low power consumption mode). This can achieve far more power saving in a human detection operation than in the conventional operation illustrated in FIG. 17 (70% in the normal operation mode and 30% in the low power consumption mode).

In a second exemplary embodiment, in step S404 in FIG. 5, a sensor reading pattern different from that in the first exemplary embodiment is created.

In the above first exemplary embodiment, the description has been given of a configuration in which a predetermined range having its center at the position of a sensor determined to have detected a person is created as a sensor reading pattern.

In the second exemplary embodiment, a sensor reading pattern is created considering that a person further approaches the image forming apparatus 100 from another direction different from the position of the sensor determined to have detected a person.

Figure 13:
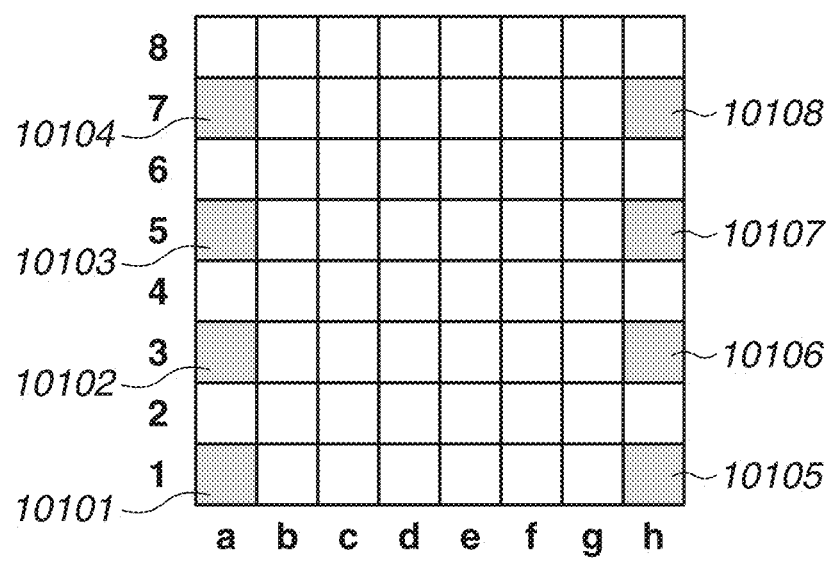
FIG. 13 is a diagram for illustrating elements from which temperature data is read according to a second exemplary embodiment.
Figure 14:
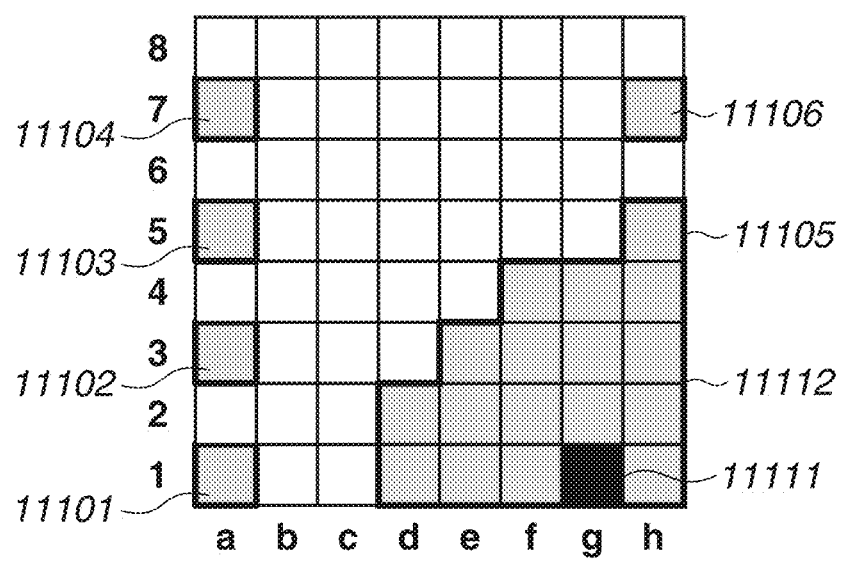
FIG. 14 is a diagram for illustrating elements from which temperature data is read according to the second exemplary embodiment.

With reference to FIGS. 13 and 14, only the differences from the first exemplary embodiment will be described below.

FIGS. 13 and 14 are diagrams for illustrating elements from which the determination unit 602 reads temperature data in the infrared array sensor 601 according to the second exemplary embodiment.

In step S404 in FIG. 5, if the element 1g (6101) detects a temperature equal to or higher than the predetermined temperature, that is, if the presence of a person is recognized at the detection position of the element 1g (6101), the determination unit 602 creates a sensor reading pattern as described below. Specifically, the determination unit 602 creates a sensor reading pattern for reading data from the elements in the sensor reading pattern 7102 as illustrated in FIG. 8 similarly to the first exemplary embodiment and also reading data from predetermined elements 10101 to 10108 as illustrated in FIG. 13. For example, if it is determined that the element 1g (11111 in FIG. 14) detects a person, then in step S404 in FIG. 5, the determination unit 602 creates a sensor reading pattern (11101 to 10106 and 11112) illustrated in FIG. 14.

The rest of the configuration is similar to that of the first exemplary embodiment and therefore will not be described here.

In FIG. 13, the description has been given of a case where some of the elements placed in the outermost portion of the infrared array sensor 601, for example, some of the elements (the sensors on the odd-numbered rows in the example of FIG. 13) on both the left and right edges (the columns a and h) of the infrared array sensor 601 in FIG. 13, are added to a sensor reading pattern. Alternatively, the elements on the even-numbered rows on both the left and right edges may be added to a sensor reading pattern. Yet alternatively, the configuration may be such that in a reading pattern, the elements on both the left and right edges are read by skipping two or more rows, or all the elements on both edges are read. Yet alternatively, the configuration may be such that not only the elements on both the left and right edges but all the elements in the outermost portion are read.

Further, in the second exemplary embodiment, the description has been given of a configuration in which a predetermined element group as illustrated in FIG. 13 is added to a reading pattern, regardless of the position of an element having detected a person. Alternatively, the configuration may be such that an element group present on the side opposite, in the left-right direction in FIG. 13, to the position of a sensor determined to have detected a person is added to a sensor reading pattern. That is, the configuration may be such that some of the elements placed in the outermost portion of the infrared array sensor 601 on the side where, if the infrared array sensor 601 is divided in the column direction, the position of an element having detected a person is not included are added to a sensor reading pattern.

For example, if an element on any of the columns e to h detects a person, some of the elements on the column a (e.g., 10101 to 10104) may be added to a sensor reading pattern. If, on the other hand, an element on any of the columns a to d detects a person, some of the elements on the column h (e.g., 10105 to 10108) may be added to a sensor reading pattern.

Further, the configuration may be such that if it is determined that an element near the center detects a person, element groups present on both the left and right edges are added to a sensor reading pattern. For example, if an element on any of the columns d and e detects a person, some of the elements on the columns a and h (e.g., 10101 to 10104 and 10105 to 10108) may be added to a sensor reading pattern. In this case, if an element on any of the columns f to h detects a person, some of the elements on the column a (e.g., 10101 to 10104) are added to a sensor reading pattern. If an element on any of the columns a to c detects a person, some of the sensors on the column h (e.g., 10105 to 10108) are added to a sensor reading pattern.

As described above, in the second exemplary embodiment, the following element group is created as a sensor reading pattern. The element group corresponds to the logical sum of a predetermined element group having its center at an element determined to have detected a person, and a part of a predetermined element group placed in an outermost portion of an infrared array sensor or a part of an element group placed in the outermost portion on the side opposite, in the left-right direction, to the element determined to have detected a person.

With such a configuration, according to the second exemplary embodiment, when data is acquired from the infrared array sensor 601 in step S405 in FIG. 5, it is also possible to efficiently detect the entry of a person from the opposite direction to the element determined to have detected the presence of a person in step S403 or S408 in FIG. 5.

In a third exemplary embodiment, a description will be given of a configuration in which the reading time of the infrared array sensor 601 in step S405 in FIG. 5 is shortened to achieve a reduction in the power consumption of the sensor unit 15.

Figure 15:
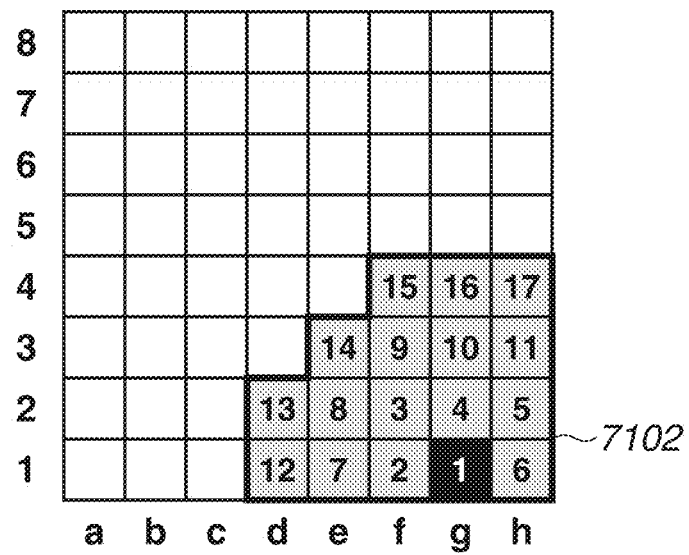
FIG. 15 is a diagram illustrating an order of elements from which temperature data is read according to a third exemplary embodiment.
Figure 16:
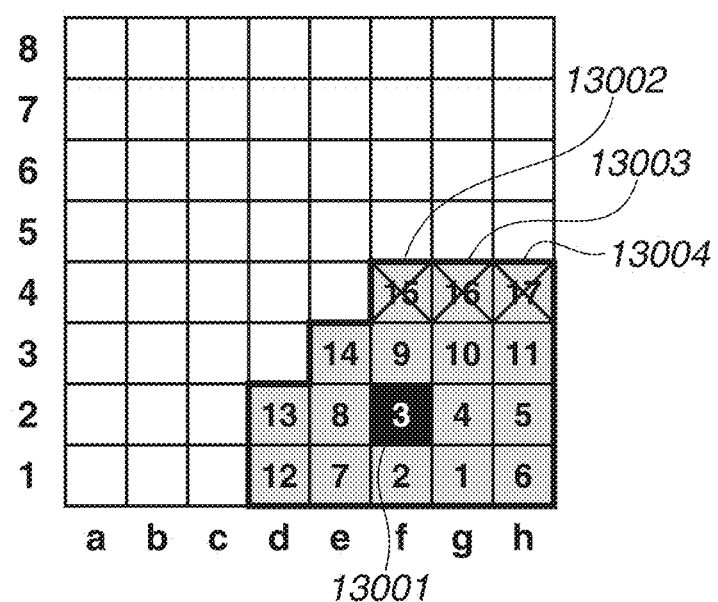
FIG. 16 is a diagram illustrating a case where reading of temperature data is stopped according to the third exemplary embodiment.

With reference to FIGS. 15 and 16, only the differences from the first and second exemplary embodiments will be described below.

In step S404 in FIG. 5, the determination unit 602 creates a sensor reading pattern 7102 as illustrated in FIG. 15 and also determines the order of reading individual elements in the sensor reading pattern 7102.

FIG. 15 is a diagram for illustrating the order of elements from which the determination unit 602 reads temperature data in the infrared array sensor 601 according to the third exemplary embodiment. In FIG. 15, a numerical value described in each element indicates its place in the order of reading elements.

In the example illustrated in FIG. 15, the determination unit 602 sets the order of reading elements so that data is read from the elements concentrically with respect to the element 1g, at which a person is determined to be present, and in order of placement position from closest to the element 1g to farthest from the element 1g, such as 1g→1f→2f→2g→ . . . →4f→4g→4h. The description has been given of an example in which the concentric elements are sequentially read clockwise. Alternatively, the concentric elements may be sequentially read counterclockwise.

Next, the determination unit 602 reads data from the elements in the infrared array sensor 601 in the order determined as described above. Then, when it is determined that a person is present at the element 2f (13001) in FIG. 16, the determination unit 602 stops the reading of the infrared sensor.

The algorithm for determining whether to stop the reading is as follows. The determination unit 602 stores the maximum temperature of an element from which data is read and the position of the element. If all the temperatures read from the elements around (adjacent to) the element are lower than the stored maximum temperature, the determination unit 602 determines that a person is present at the detection position of the element. Then, the determination unit 602 stops the reading. That is, if a person is present at the detection position of the element 2f (13001) in FIG. 16, the determination unit 602 stops the reading of data of the subsequent elements (13002 to 13004) when the determination unit 602 reads data of the element 3e.

As described above, according to the third exemplary embodiment, in the process of setting the order of reading elements in the infrared array sensor 601, and then acquiring data of the elements in the set order, when it is determined that a person is detected, the acquisition of data from the subsequent elements is stopped (omitted) in the process. This can shorten the operating time of the determination unit 602 and further reduce the power consumption.

The configuration of the third exemplary embodiment is also applicable to a sensor reading pattern as described in the second exemplary embodiment. For example, the order of reading elements is set so that after data is read from the elements in the order illustrated in FIG. 15, data is further read from the elements concentrically with respect to the element 1g and in order from the closest element, such as 11105→11101→11102→11106→11103→11104 in FIG. 14. The description has been given of an example in which the concentric elements are sequentially read clockwise. Alternatively, the concentric elements may be sequentially read counterclockwise.

Thus, according to an exemplary embodiment of the present invention, the determination unit 602 can efficiently acquire the detection result from the infrared array sensor 601. This can shorten the operating time including the acquisition time of the detection result and the determination time based on the detection result. Consequently, it is possible to further reduce the power consumed in a user detection operation and reduce the power consumption of an image forming apparatus in a power saving state.

Thus, it is possible to achieve both the power saving and the responsiveness (usability) of an image forming apparatus.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments.

This application claims the benefit of Japanese Patent Application No. 2014-147415, filed Jul. 18, 2014, which is hereby incorporated by reference herein in its entirety.

What is claimed is:

1. An image forming apparatus having a first power state and a second power state, which is lower in power consumption than the first power state, the image forming apparatus comprising:
  a sensor unit which includes a plurality of elements to detect a human; and
  a control unit configured to acquire a detection result from part of the plurality of elements and to determine whether a human is present in a detection range of the sensor unit based on the detection result from the part of the plurality of elements, and in a case where it is determined that a human is present in the detection range, to acquire a detection result from at least another part of the plurality of elements of the sensor unit and to determine whether to shift the image forming apparatus from the second power state to the first power state based on the detection result from at least another part of the plurality of elements.

2. The image forming apparatus according to claim 1, wherein, before determining that a person is present in the detection range, the control unit is configured to acquire a detection result from the part of the plurality of elements during a predetermined period, and after determining that a person is present in the detection range, the control unit is configured to acquire a detection result from the part of the plurality of elements during the predetermined period.

3. The image forming apparatus according to claim 2, wherein, after acquiring the detection result from the part of the plurality of elements during the predetermined period, the control unit is configured to wait until the predetermined period elapses.

4. The image forming apparatus according to claim 1, wherein, in a case where the detection result acquired from the part of the plurality of elements indicates a temperature equal to or higher than a predetermined temperature, the control unit is configured to determine that a person is present in the detection range of the sensor unit.

5. The image forming apparatus according to claim 1, wherein the elements are infrared receiving elements for receiving infrared light radiated from an object.

6. The image forming apparatus according to claim 1, wherein the sensor unit is an array sensor in which the plurality of elements are arranged in a grid.

7. An image forming apparatus having a first power state and a second power state, which is lower in power consumption than the first power state, the image forming apparatus comprising:
   a sensor unit which includes a plurality of elements to detect a human; and
   a control unit configured to acquire a detection result from part of the plurality of elements and to determine whether a human is present in a detection range of the sensor unit based on the detection result from part of the plurality of elements, to determine a plurality of elements around an element having detected the human, to acquire a detection result from the plurality of determined elements around the element having detected the human, and to determine whether to shift the image forming apparatus from the second power state to the first power state based on the detection result from the plurality of determined elements around the element having detected the human.

8. The image forming apparatus according to claim 7, wherein the control unit is configured to determine, as the plurality of elements, elements placed in a predetermined range having its center at an element from which a detection result indicating a temperature equal to or higher than a predetermined temperature is acquired.

9. The image forming apparatus according to claim 7, wherein the control unit is configured to determine, as the plurality of elements, elements placed in a predetermined range having its center at an element from which a detection result indicating a temperature equal to or higher than a predetermined temperature is acquired, and elements placed in an outermost portion of the sensor unit.

10. The image forming apparatus according to claim 7, wherein the control unit is configured to determine, as the plurality of elements, elements placed in a predetermined range having its center at an element from which a detection result indicating a temperature equal to or higher than a predetermined temperature is acquired, and elements placed in an outermost portion of the sensor unit on a side where, in a case where the sensor unit is divided in a predetermined direction, the element from which the detection result indicating the temperature equal to or higher than the predetermined temperature is acquired is not included.

11. The image forming apparatus according to claim 7, wherein, in a case where it is determined, based on the detection result acquired from the plurality of determined elements, that a person is not present in the detection range of the sensor unit, the control unit is configured to acquire a detection result from the part of the plurality of elements again.

12. The image forming apparatus according to claim 7, wherein the elements are infrared receiving elements for receiving infrared light radiated from an object.

13. The image forming apparatus according to claim 7, wherein the sensor unit is an array sensor in which the plurality of elements are arranged in a grid.

14. The image forming apparatus according to claim 7, wherein, before determining that a person is present in the detection range, the control unit is configured to acquire a detection result from the part of the plurality of elements during a predetermined period, and after determining that a person is present in the detection range, the control unit is configured to acquire a detection result from the plurality of elements during the predetermined period.

15. The image forming apparatus according to claim 14, wherein, after acquiring the detection result from the part of the plurality of elements during the predetermined period, the control unit is configured to wait until the predetermined period elapses, and after acquiring the detection result from the plurality of elements during the predetermined period, the control unit is configured to wait until the predetermined period elapses.

16. The image forming apparatus according to claim 7, wherein, in a case where the detection result acquired from the part of the plurality of elements indicates a temperature equal to or higher than a predetermined temperature, the control unit is configured to determine that a person is present in the detection range of the sensor unit.

17. The image forming apparatus according to claim 7, wherein, in a case where the detection result acquired from an element in a predetermined area among the plurality of elements indicates a temperature equal to or higher than a predetermined temperature, the control unit is configured to determine that a person is present in the detection range of the sensor unit.

18. A method for controlling an image forming apparatus including a sensor unit which includes a plurality of elements to detect a human, and having a first power state and a second power state, which is lower in power consumption than the first power state, the method comprising:
   acquiring a detection result from part of the plurality of elements and determining whether a human is present in a detection range of the sensor unit based on the detection result from the part of the plurality of elements; and
   in a case where it is determined that a person is present in the detection range, acquiring a detection result from at least another part of the plurality of elements of the sensor unit and determining whether to shift the image forming apparatus from the second power state to the first power state based on the detection result from at least another part of the plurality of elements.

19. A method for controlling an image forming apparatus including a sensor unit which includes a plurality of elements to detect a human, and having a first power state and a second power state, which is lower in power consumption than the first power state, the method comprising:
   acquiring a detection result from part of the plurality of elements;
   determining whether a human is present in a detection range of the sensor unit based on the detection result from the part of the plurality of elements;
   determining a plurality of elements around an element having detected a human;
   acquiring a detection result from the plurality of determined elements around the element having detected the human; and
   determining whether to shift the image forming apparatus from the second power state to the first power state based on the detection result from the plurality of determined elements around the element having detected the human.

* * * * *